(12) United States Patent
Epperson et al.

(10) Patent No.: US 12,487,008 B2
(45) Date of Patent: Dec. 2, 2025

(54) METHOD OF COMMISSIONING AN HVAC SYSTEM

(71) Applicant: Trane International Inc., Davidson, NC (US)

(72) Inventors: Daren Lee Epperson, Tyler, TX (US); Kirk W. Beason, Tyler, TX (US); David Williams, Jr., Tyler, TX (US); Neal Harrington, Tyler, TX (US)

(73) Assignee: Trane International Inc., Davidson, NC (US)

( * ) Notice: Subject to any disclaimer, the term of this patent is extended or adjusted under 35 U.S.C. 154(b) by 710 days.

(21) Appl. No.: 17/576,459

(22) Filed: Jan. 14, 2022

(65) Prior Publication Data

US 2023/0228451 A1 Jul. 20, 2023

(51) Int. Cl.
*F24F 13/22* (2006.01)
*F24F 11/72* (2018.01)

(52) U.S. Cl.
CPC ............ *F24F 13/222* (2013.01); *F24F 11/72* (2018.01); *F24F 2013/227* (2013.01)

(58) Field of Classification Search
CPC ...... F24F 1/0057; F24F 11/36; F24F 2110/00; F25D 21/00; F25D 21/04; F25D 21/14; F25B 2700/13; F25B 2600/05
See application file for complete search history.

(56) References Cited

U.S. PATENT DOCUMENTS

| | | |
|---|---|---|
| 4,138,856 A | 2/1979 | Orlowski |
| 4,711,096 A | 12/1987 | Krantz |
| 4,896,052 A | 1/1990 | Morrison et al. |
| 5,264,368 A | 11/1993 | Clarke et al. |
| 5,284,027 A * | 2/1994 | Martin, Sr. ............. F24F 3/044 62/298 |
| 5,742,066 A | 4/1998 | Cavestri |
| 5,820,262 A | 10/1998 | Lechner |

(Continued)

FOREIGN PATENT DOCUMENTS

| | | |
|---|---|---|
| BR | 112019010410 A2 | 9/2019 |
| CA | 3065728 C | 6/2021 |

(Continued)

OTHER PUBLICATIONS

U.S. Pat. No. 11/402,122, Sep. 13, 2022, Tsuji (Withdrawn).

*Primary Examiner* — Jianying C Atkisson
*Assistant Examiner* — Meraj A Shaikh
(74) *Attorney, Agent, or Firm* — Womble Bond Dickinson (US) LLP

(57) ABSTRACT

Example embodiments of the present disclosure relate to a method of commissioning an HVAC system and a related unit. Some embodiments of the method include providing a unit of the HVAC system with a plurality of condensate outlets such that the unit may be installed in a plurality of orientations; installing the unit in a preferred orientation; selecting one of the condensate outlets from the plurality of outlets that is positioned to receive condensate based on the preferred orientation; attaching a condensate line to the selected one of the condensate outlets; and installing a sensor along the condensate line, the sensor configured to detect a presence of a refrigerant that is heavier than air and would flow with gravity along with the condensate collected by the unit.

16 Claims, 4 Drawing Sheets

(56) References Cited

U.S. PATENT DOCUMENTS

| | | | |
|---|---|---|---|
| 5,918,475 | A | 7/1999 | Sakakibara |
| 6,085,531 | A | 7/2000 | Numoto |
| 6,321,556 | B1* | 11/2001 | Tesche .................. F24F 1/0043 62/298 |
| 6,442,955 | B1* | 9/2002 | Oakner ................. F24F 13/222 340/618 |
| 6,644,047 | B2 | 11/2003 | Taira |
| 6,655,161 | B1 | 12/2003 | Koo |
| 6,701,722 | B1 | 3/2004 | Seo |
| 6,742,384 | B2 | 6/2004 | Avila |
| 6,772,598 | B1 | 8/2004 | Rinehart |
| 6,791,088 | B1 | 9/2004 | Williams, II |
| 6,889,537 | B2 | 5/2005 | Anderson |
| 7,143,591 | B2 | 12/2006 | Nonaka |
| 7,181,954 | B2 | 2/2007 | Horie |
| 7,631,508 | B2 | 12/2009 | Braun |
| 7,647,784 | B2 | 1/2010 | Mizutani et al. |
| 7,752,853 | B2 | 7/2010 | Singh |
| 7,814,757 | B2 | 10/2010 | Zima |
| 7,946,121 | B2 | 5/2011 | Yamaguchi et al. |
| 7,987,679 | B2 | 8/2011 | Tanaka |
| 8,005,648 | B2 | 8/2011 | Johnson |
| 8,070,355 | B2 | 12/2011 | Minor |
| 8,180,495 | B1 | 5/2012 | Roy |
| 8,302,414 | B2 | 11/2012 | Hisaoka |
| 8,402,779 | B2 | 3/2013 | Nishimura et al. |
| 8,570,179 | B2 | 10/2013 | Holloway |
| 8,695,404 | B2 | 4/2014 | Kadle |
| 8,786,437 | B2 | 7/2014 | Breed |
| 8,899,099 | B2 | 12/2014 | Grosse Bley |
| 9,164,519 | B2 | 10/2015 | Holloway |
| 9,291,378 | B2 | 3/2016 | Ueda et al. |
| 9,541,319 | B2 | 1/2017 | Morimoto |
| 9,568,227 | B2 | 2/2017 | Douglas |
| 9,625,195 | B2 | 4/2017 | Hiraki |
| 9,726,410 | B2 | 8/2017 | Gao |
| 9,791,195 | B2 | 10/2017 | Okada |
| 9,869,499 | B2 | 1/2018 | Liu |
| 10,088,202 | B2 | 10/2018 | Huff et al. |
| 10,126,012 | B2 | 11/2018 | Ikawa |
| 10,126,031 | B2 | 11/2018 | Shockley |
| 10,151,663 | B2 | 12/2018 | Scancarello |
| 10,203,136 | B2 | 2/2019 | Nishimura |
| 10,247,441 | B2 | 4/2019 | Suzuki |
| 10,354,332 | B2 | 7/2019 | Trainor |
| 10,399,412 | B2 | 9/2019 | Mathe |
| 10,401,253 | B2 | 9/2019 | Cooper et al. |
| 10,408,484 | B2 | 9/2019 | Honda |
| 10,408,488 | B2 | 9/2019 | Suzuki |
| 10,416,113 | B2 | 9/2019 | Chen et al. |
| 10,424,190 | B2 | 9/2019 | Zribi et al. |
| 10,458,689 | B2 | 10/2019 | Suzuki |
| 10,479,170 | B2 | 11/2019 | Enomoto et al. |
| 10,480,807 | B2 | 11/2019 | Goel |
| 10,488,066 | B2 | 11/2019 | Honda |
| 10,488,072 | B2 | 11/2019 | Yajima |
| 10,508,847 | B2 | 12/2019 | Yajima |
| 10,539,358 | B2 | 1/2020 | Suzuki |
| 10,557,648 | B2 | 2/2020 | Naito |
| 10,584,890 | B2 | 3/2020 | Steinberg |
| 10,605,505 | B2 | 3/2020 | Appler et al. |
| 10,634,404 | B2 | 4/2020 | Obara |
| 10,641,268 | B2 | 5/2020 | Brostrom et al. |
| 10,655,884 | B2 | 5/2020 | Iura |
| 10,677,679 | B2 | 6/2020 | Gupte |
| 10,712,035 | B2 | 7/2020 | Yamada |
| 10,714,772 | B2 | 7/2020 | Nishida et al. |
| 10,724,766 | B2 | 7/2020 | Suzuki |
| 10,767,881 | B2 | 9/2020 | Wang |
| 10,767,882 | B2 | 9/2020 | Kowald |
| 10,782,040 | B2 | 9/2020 | Wacker |
| 10,808,960 | B2 | 10/2020 | Suzuki |
| 10,816,232 | B2 | 10/2020 | Crawford |
| 10,816,247 | B2 | 10/2020 | McQuade |
| 10,823,445 | B2 | 11/2020 | Suzuki |
| 10,928,091 | B2 | 2/2021 | Crawford |
| 10,935,454 | B2 | 3/2021 | Kester |
| 10,941,956 | B2 | 3/2021 | Gao |
| 10,996,131 | B2 | 5/2021 | McQuade |
| 11,002,467 | B2 | 5/2021 | Wada |
| 11,015,828 | B2 | 5/2021 | Sakae |
| 11,015,834 | B2 | 5/2021 | Kageyama |
| 11,015,852 | B2 | 5/2021 | Sakae |
| 11,022,346 | B2 | 6/2021 | Sun |
| 11,041,647 | B2 | 6/2021 | Weinert |
| 11,041,666 | B2 | 6/2021 | Sakae |
| 11,067,303 | B2 | 7/2021 | Obara |
| 11,067,321 | B2 | 7/2021 | Suzuki |
| 11,079,149 | B2 | 8/2021 | Papas |
| 11,079,300 | B2 | 8/2021 | Shi |
| 11,092,566 | B2 | 8/2021 | Chen |
| 11,098,915 | B2 | 8/2021 | Crawford |
| 11,117,449 | B2 | 9/2021 | Renault |
| 11,118,821 | B2 | 9/2021 | Matsuda |
| 11,118,822 | B2 | 9/2021 | Kujak |
| 11,125,457 | B1 | 9/2021 | Alfano |
| 11,131,470 | B2 | 9/2021 | Minamida |
| 11,137,184 | B2 | 10/2021 | Yamada et al. |
| 11,143,439 | B2 | 10/2021 | Matsuda |
| 11,150,156 | B2 | 10/2021 | Nanba |
| 11,162,725 | B2 | 11/2021 | Suzuki |
| 11,175,060 | B2 | 11/2021 | Mowris |
| 11,199,337 | B2 | 12/2021 | Kawashima |
| 11,231,199 | B2 | 1/2022 | Ikeda |
| 11,248,816 | B2 | 2/2022 | Ikawa |
| 11,260,728 | B2 | 3/2022 | Kondrk |
| 11,262,097 | B2 | 3/2022 | Suzuki |
| 11,268,718 | B2 | 3/2022 | Minamida |
| 11,274,866 | B2 | 3/2022 | Yamada |
| 11,274,871 | B2 | 3/2022 | Sakae |
| 11,280,507 | B2 | 3/2022 | Yoneyama |
| 11,280,523 | B2 | 3/2022 | Sakae |
| 11,293,674 | B2 | 4/2022 | Yamada |
| 11,306,954 | B2 | 4/2022 | Arensmeier |
| 11,346,570 | B2 | 5/2022 | Yoshimi |
| 11,353,247 | B2 | 6/2022 | Bernhardt |
| 11,359,846 | B2 | 6/2022 | Welch |
| 11,378,313 | B2 | 7/2022 | Goel |
| 11,378,316 | B2 | 7/2022 | Walser |
| 11,407,287 | B2 | 8/2022 | Repice |
| 11,408,624 | B2 | 8/2022 | Hovardas |
| 11,428,435 | B2 | 8/2022 | Eskew |
| 11,435,102 | B2 | 9/2022 | Watanabe |
| 11,435,124 | B2 | 9/2022 | Kondrk |
| 11,441,803 | B2 | 9/2022 | Goel |
| 11,441,813 | B2 | 9/2022 | Tsuji |
| 11,441,820 | B2 | 9/2022 | Weyna |
| 11,472,265 | B2 | 10/2022 | Stockbridge |
| 11,506,411 | B2 | 11/2022 | Shirai |
| 11,530,830 | B2 | 12/2022 | Watanabe |
| 11,536,502 | B2 | 12/2022 | Yajima |
| 11,573,149 | B2 | 2/2023 | Gupte |
| 11,578,887 | B2 | 2/2023 | Delgoshaei |
| 11,598,560 | B2 | 3/2023 | Yajima |
| 11,604,019 | B2 | 3/2023 | Alfano |
| 11,604,156 | B2 | 3/2023 | Chen |
| 11,609,009 | B2 | 3/2023 | Blanton |
| 11,609,031 | B2 | 3/2023 | Matsuda |
| 11,609,032 | B2 | 3/2023 | Butler |
| 11,609,046 | B2 | 3/2023 | Thobias |
| 11,614,249 | B2 | 3/2023 | Chen |
| 11,635,339 | B2 | 4/2023 | Willett |
| 11,644,225 | B2 | 5/2023 | Delgoshaei |
| 11,674,727 | B2 | 6/2023 | De |
| 2002/0178738 | A1* | 12/2002 | Taira ....................... F24F 11/30 62/181 |
| 2004/0168505 | A1 | 9/2004 | Dudley |
| 2008/0295580 | A1 | 12/2008 | Minor |
| 2009/0107157 | A1 | 4/2009 | Dube |
| 2011/0112814 | A1 | 5/2011 | Clark |
| 2011/0277541 | A1* | 11/2011 | Kadle ................. B60H 1/00978 73/40 |
| 2012/0071082 | A1* | 3/2012 | Karamanos ........... F24F 5/0003 29/890.03 |

(56) References Cited

U.S. PATENT DOCUMENTS

| | | |
|---|---|---|
| 2013/0213068 A1 | 8/2013 | Goel |
| 2017/0122833 A1 | 5/2017 | Furry |
| 2018/0327179 A1 | 11/2018 | Papas |
| 2019/0133341 A1 | 5/2019 | Fischer |
| 2019/0170384 A1 | 6/2019 | McQuade |
| 2019/0170599 A1 | 6/2019 | Kester |
| 2019/0170600 A1 | 6/2019 | Tice |
| 2019/0170603 A1 | 6/2019 | Gupte |
| 2019/0195542 A1 | 6/2019 | Hansen et al. |
| 2019/0195550 A1 | 6/2019 | Sakae et al. |
| 2019/0264963 A1 | 8/2019 | Kondrk |
| 2019/0316820 A1 | 10/2019 | Zhai |
| 2019/0316821 A1 | 10/2019 | Zhai et al. |
| 2019/0390877 A1 | 12/2019 | Sakae et al. |
| 2020/0011560 A1 | 1/2020 | Minamida |
| 2020/0033036 A1 | 1/2020 | Yamada et al. |
| 2020/0049361 A1 | 2/2020 | Minamida et al. |
| 2020/0110000 A1 | 4/2020 | Roth |
| 2020/0124493 A1 | 4/2020 | Duerr |
| 2020/0166470 A1 | 5/2020 | Chen et al. |
| 2020/0182734 A1 | 6/2020 | Ueno et al. |
| 2020/0208861 A1 | 7/2020 | Chen |
| 2020/0232685 A1 | 7/2020 | Swab |
| 2020/0240869 A1 | 7/2020 | Yesh et al. |
| 2020/0263891 A1 | 8/2020 | Noor |
| 2020/0271344 A1 | 8/2020 | Ikeda et al. |
| 2020/0300522 A1 | 9/2020 | Inao |
| 2020/0309434 A1 | 10/2020 | Walser et al. |
| 2020/0318887 A1 | 10/2020 | Tsutsumi |
| 2020/0324624 A1 | 10/2020 | Repice et al. |
| 2020/0355420 A1 | 11/2020 | Goel et al. |
| 2020/0386431 A1 | 12/2020 | Kondrk |
| 2020/0393140 A1 | 12/2020 | Nouchi |
| 2021/0001689 A1 | 1/2021 | Kondrk et al. |
| 2021/0018199 A1 | 1/2021 | Blanton |
| 2021/0071887 A1 | 3/2021 | Jaber et al. |
| 2021/0095876 A1 | 4/2021 | Branson et al. |
| 2021/0095887 A1 | 4/2021 | Kilgo |
| 2021/0108819 A1 | 4/2021 | Chen |
| 2021/0108820 A1 | 4/2021 | Hovardas |
| 2021/0108857 A1 | 4/2021 | Thobias et al. |
| 2021/0123624 A1 | 4/2021 | Kronstrom |
| 2021/0131696 A1 | 5/2021 | She et al. |
| 2021/0140650 A1 | 5/2021 | Wilson |
| 2021/0140662 A1 | 5/2021 | Goel et al. |
| 2021/0148620 A1 | 5/2021 | Yamada et al. |
| 2021/0164678 A1 | 6/2021 | Delgoshaei |
| 2021/0190353 A1 | 6/2021 | Blanton |
| 2021/0199359 A1 | 7/2021 | Grabon |
| 2021/0207830 A1 | 7/2021 | Chen |
| 2021/0207831 A1 | 7/2021 | Lord |
| 2021/0213802 A1 | 7/2021 | Poolman et al. |
| 2021/0215413 A1 | 7/2021 | Deaville |
| 2021/0229528 A1 | 7/2021 | Stockbridge |
| 2021/0247086 A1 | 8/2021 | Sasaki |
| 2021/0247096 A1 | 8/2021 | Hovardas |
| 2021/0268875 A1 | 9/2021 | Weyna et al. |
| 2021/0278128 A1 | 9/2021 | Scarcella |
| 2021/0285680 A1 | 9/2021 | Atchison et al. |
| 2021/0285840 A1 | 9/2021 | Willett |
| 2021/0293430 A1 | 9/2021 | Yamada |
| 2021/0293431 A1 | 9/2021 | Delgoshaei |
| 2021/0293446 A1 | 9/2021 | Fard |
| 2021/0302056 A1 | 9/2021 | Eskew et al. |
| 2021/0310678 A1 | 10/2021 | Weinert |
| 2021/0348820 A1 | 11/2021 | Kobayashi |
| 2021/0356150 A1 | 11/2021 | Green et al. |
| 2021/0356154 A1 | 11/2021 | Kobayashi |
| 2021/0356155 A1 | 11/2021 | Yoshimi et al. |
| 2021/0364180 A1 | 11/2021 | Chen |
| 2021/0396413 A1 | 12/2021 | Maddox |
| 2021/0396696 A1 | 12/2021 | Hornung |
| 2021/0404685 A1 | 12/2021 | Butler |
| 2022/0003443 A1 | 1/2022 | Kobayashi |
| 2022/0003471 A1 | 1/2022 | Welch |
| 2022/0003472 A1 | 1/2022 | Okuda |
| 2022/0034535 A1 | 2/2022 | Kobayashi et al. |
| 2022/0034568 A1 | 2/2022 | Satou |
| 2022/0042698 A1 | 2/2022 | Butler |
| 2022/0057100 A1 | 2/2022 | Ikeda |
| 2022/0065832 A1 | 3/2022 | Oggianu |
| 2022/0082304 A1 | 3/2022 | Welch |
| 2022/0090979 A1 | 3/2022 | Kester |
| 2022/0099346 A1 | 3/2022 | Alfano |
| 2022/0128253 A1 | 4/2022 | Suzuki |
| 2022/0128277 A1 | 4/2022 | Fukuyama |
| 2022/0128278 A1 | 4/2022 | Parker |
| 2022/0128281 A1 | 4/2022 | Tsuji |
| 2022/0134844 A1 | 5/2022 | Palmisano |
| 2022/0146132 A1 | 5/2022 | McQuade |
| 2022/0170654 A1 | 6/2022 | Delgoshaei |
| 2022/0186960 A1 | 6/2022 | Hirai |
| 2022/0221184 A1 | 7/2022 | Gupta |
| 2022/0243938 A1 | 8/2022 | Notaro |
| 2022/0243939 A1 | 8/2022 | Notaro |
| 2022/0243940 A1 | 8/2022 | Notaro |
| 2022/0243941 A1 | 8/2022 | Notaro |
| 2022/0252291 A1 | 8/2022 | Alfano |
| 2022/0252304 A1 | 8/2022 | Green |
| 2022/0297510 A1 | 9/2022 | Kondrk |
| 2022/0307711 A1 | 9/2022 | Lord |
| 2022/0307740 A1 | 9/2022 | Lord |
| 2022/0307937 A1 | 9/2022 | Thyssen |
| 2022/0341612 A1 | 10/2022 | West |
| 2022/0341804 A1 | 10/2022 | West |
| 2022/0349600 A1 | 11/2022 | Alfano |
| 2022/0397297 A1 | 12/2022 | Foster |
| 2023/0009291 A1 | 1/2023 | Hjortland |
| 2023/0032795 A1 | 2/2023 | Sunderland |
| 2023/0048352 A1 | 2/2023 | Wright |
| 2023/0058790 A1 | 2/2023 | Rumler |
| 2023/0085125 A1 | 3/2023 | Yamaguchi |
| 2023/0107694 A1 | 4/2023 | Kawano |
| 2023/0109334 A1 | 4/2023 | Welch |
| 2023/0117306 A1 | 4/2023 | Petele |

FOREIGN PATENT DOCUMENTS

| | | |
|---|---|---|
| CN | 110375466 A | 10/2019 |
| CN | 110375467 A | 10/2019 |
| CN | 110646362 A | 1/2020 |
| CN | 109073262 B | 8/2020 |
| DE | 102019205908 A1 | 10/2020 |
| DE | 102017217685 B4 | 10/2021 |
| EP | 0783099 A1 | 7/1997 |
| EP | 2354724 A3 | 11/2014 |
| EP | 3054231 B1 | 7/2018 |
| EP | 3374701 A1 | 9/2018 |
| EP | 3457044 A4 | 5/2019 |
| EP | 3460347 A4 | 5/2019 |
| EP | 3428554 B1 | 7/2019 |
| EP | 3425295 B1 | 9/2019 |
| EP | 3321607 B1 | 12/2019 |
| EP | 3405629 A4 | 1/2020 |
| EP | 3683518 A1 | 7/2020 |
| EP | 3693687 A3 | 10/2020 |
| EP | 3730854 A1 | 10/2020 |
| EP | 3751209 A1 | 12/2020 |
| EP | 3534084 B1 | 2/2021 |
| EP | 3584522 B1 | 4/2021 |
| EP | 3798527 A4 | 5/2021 |
| EP | 3816542 A1 | 5/2021 |
| EP | 3040654 B1 | 6/2021 |
| EP | 3875861 A1 | 9/2021 |
| EP | 3901526 A1 | 10/2021 |
| EP | 3901530 A1 | 10/2021 |
| EP | 3859223 A4 | 11/2021 |
| EP | 3859249 A4 | 11/2021 |
| EP | 3906382 A1 | 11/2021 |
| EP | 3911931 A2 | 11/2021 |
| EP | 3686520 B1 | 12/2021 |
| EP | 3919837 A1 | 12/2021 |
| EP | 3943858 A1 | 1/2022 |
| EP | 3961119 A1 | 3/2022 |

(56) References Cited

FOREIGN PATENT DOCUMENTS

| | | | |
|---|---|---|---|
| EP | 3974032 A1 | 3/2022 |
| EP | 4033165 A1 | 7/2022 |
| EP | 3279580 B1 | 9/2022 |
| EP | 3869122 B1 | 11/2022 |
| EP | 4160101 A1 | 4/2023 |
| ES | 2804267 T3 | 2/2021 |
| FR | 3102237 A1 | 4/2021 |
| FR | 3111418 A1 | 12/2021 |
| JP | 2002092714 A | 3/2002 |
| JP | 2002263445 A | 9/2002 |
| JP | 2007127316 A | 5/2007 |
| JP | 2010210129 A | 9/2010 |
| JP | 2014-035171 | 2/2014 |
| JP | 2014035171 A | 11/2014 |
| JP | 6466219 B2 | 2/2019 |
| JP | 6528446 B2 | 6/2019 |
| JP | WO2019016959 A1 | 7/2019 |
| JP | 6557329 B2 | 8/2019 |
| JP | 6628833 B2 | 1/2020 |
| JP | 6656363 B2 | 3/2020 |
| JP | 6701337 B2 | 5/2020 |
| JP | 2020515850 A | 5/2020 |
| JP | 6766638 B2 | 10/2020 |
| JP | 6766639 B2 | 10/2020 |
| JP | 2020169798 A | 10/2020 |
| JP | 6779355 B2 | 11/2020 |
| JP | 2020183829 A | 11/2020 |
| JP | 2021075076 A | 5/2021 |
| JP | 6931093 B2 | 9/2021 |
| JP | 2021131182 A | 9/2021 |
| JP | 2021131194 A | 9/2021 |
| JP | 2021131200 A | 9/2021 |
| JP | WO2020194490 A1 | 11/2021 |
| KR | 20190009713 A | 1/2019 |
| KR | 20190058448 A | 5/2019 |
| KR | 20210001769 A | 1/2021 |
| KR | 20210042970 A | 4/2021 |
| MX | 2019011319 A | 3/2016 |
| RU | 2720037 C2 | 4/2020 |
| WO | 2010007448 A1 | 1/2010 |
| WO | 2014160831 A1 | 10/2014 |
| WO | 2017002215 A1 | 1/2017 |
| WO | 2021260588 A1 | 12/2021 |
| WO | 2022244177 A1 | 11/2022 |
| WO | 2022264368 A1 | 12/2022 |

\* cited by examiner

METHOD OF COMMISSIONING AN HVAC SYSTEM

TECHNOLOGICAL FIELD

The present disclosure relates generally to commissioning a heating, ventilation, and/or air conditioning (HVAC) system; more particularly to a method of commissioning an HVAC system by installing a sensor along a condensate line to detect a presence of refrigerant.

BACKGROUND

Heating, ventilation, and/or air conditioning (HVAC) systems may generally be used in residential and/or commercial areas for heating and/or cooling to create comfortable temperatures inside those areas. As part of these systems, refrigerant is used to absorb heat from conditioned air to provide cooled air to a conditioned space after running through various components of the HVAC systems.

Some HVAC systems may benefit from the addition of a refrigerant leak detection system to mitigate the consequences if refrigerant were to leak. Therefore, there exists a need for a method of commissioning an HVAC system, which enables efficient installation of a refrigerant leak detection system in both new or existing HVAC systems.

BRIEF SUMMARY

The present disclosure relates to a method of commissioning an HVAC system and a related unit of an HVAC system designed to overcome one or more existing issues. The present disclosure utilizes a sensor installed along a condensate line that is configured to detect a presence of refrigerant.

The present disclosure thus includes, without limitation, the following example embodiments.

Some example embodiments provide a method of commissioning an HVAC system comprises: providing a unit of the HVAC system with a plurality of condensate outlets such that the unit may be installed in a plurality of orientations; installing the unit in a preferred orientation; selecting one of the condensate outlets from the plurality of outlets that is positioned to receive condensate based on the preferred orientation; attaching a condensate line to the selected one of the condensate outlets; and installing a sensor along the condensate line, the sensor configured to detect a presence of a refrigerant that is heavier than air and would flow with gravity along with the condensate collected by the unit.

In some example embodiments of the method of any example embodiment, or any combination of any preceding example embodiments, the unit comprises a condensate pan defining a bottom surface and a side wall having a top edge extending therefrom, and wherein providing the unit with the plurality of condensate outlets comprises providing one of the plurality of condensate outlets below the top edge of the condensate pan in each of the plurality of orientations of the unit.

In some example embodiments of the method of any example embodiment, or any combination of any preceding example embodiments, the selected one of the condensate outlets defines a longitudinal axis, and wherein installing the sensor along the condensate line comprises arranging the sensor above the longitudinal axis, but below a limit of one inch above the top edge of the condensate pan.

In some example embodiments of the method of any example embodiment, or any combination of any preceding example embodiments, the method further comprises installing a condensate detection device along the condensate line.

In some example embodiments of the method of any example embodiment, or any combination of any preceding example embodiments, the unit is a multi-poise unit, and wherein installing the unit in the preferred orientation comprises installing the unit in a vertical orientation or a horizontal orientation.

In some example embodiments of the method of any example embodiment, or any combination of any preceding example embodiments, the method further comprises interacting the sensor with a control unit of the HVAC system, the control unit comprising a processor and memory and being configured to receive a signal from the sensor when the sensor detects the presence of the refrigerant, and the HVAC system being configured to turn on the indoor fan in response thereto.

In some example embodiments of the method of any example embodiment, or any combination of any preceding example embodiments, installing the sensor comprises inserting the sensor: at an open first end of the condensate line defined along a longitudinal length of the condensate line and opposing an open second end of the condensate line attached to the selected condensate outlet, or along the longitudinal length of the condensate line between the open first and second ends thereof.

In some still further example embodiments, a unit of an HVAC system comprises: a housing; a plurality of condensate outlets defined in the housing such that the unit may be installed in a plurality of orientations; a condensate line attached to a selected one of the condensate outlets that is positioned to receive condensate based on a preferred orientation; and a sensor installed along the condensate line, the sensor configured to detect a presence of a refrigerant that is heavier than air and would flow with gravity along with the condensate collected by the unit.

In some example embodiments of the unit of any example embodiment, or any combination of any preceding example embodiments, further comprises a condensate pan defining a bottom surface and a top edge extending therefrom, the condensate pan being arranged within the unit to collect the condensate on the bottom surface of the condensate pan in each of the plurality of orientations of the unit.

In some example embodiments of the unit of any example embodiment, or any combination of any preceding example embodiments, one of the plurality of condensate outlets is provided below the top edge of the condensate pan in each of the plurality of orientations of the unit.

In some example embodiments of the unit of any example embodiment, or any combination of any preceding example embodiments, the selected one of the condensate outlets defines a longitudinal axis, and the sensor is installed above the longitudinal axis, but below a limit of one inch above the top edge of the condensate pan.

In some example embodiments of the unit of any example embodiment, or any combination of any preceding example embodiments, further comprises a condensate detection device inserted along the condensate line.

In some example embodiments of the unit of any example embodiment, or any combination of any preceding example embodiments, the unit is a multi-poise unit, such that the unit is configured to be capable of operation in both a horizontal and a vertical orientation.

In some example embodiments of the unit of any example embodiment, or any combination of any preceding example embodiments, further comprises a control unit comprising a processor and memory and being configured to receive a signal from the sensor when the sensor detects the presence of the refrigerant and being configured to turn on the indoor fan in response thereto.

In some example embodiments of the unit of any example embodiment, or any combination of any preceding example embodiments, the sensor is inserted: at an open first end of the condensate line defined along a longitudinal length of the condensate line and opposing an open second end of the condensate line attached to the selected condensate outlet, or along the longitudinal length of the condensate line between the open first and second ends thereof.

These and other features, aspects, and advantages of the disclosure will be apparent from a reading of the following detailed description together with the accompanying drawings, which are briefly described below. The disclosure includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed disclosure, in any of its various aspects and embodiments, should be viewed as intended to be combinable unless the context clearly dictates otherwise.

BRIEF DESCRIPTION OF THE FIGURE(S)

In order to assist the understanding of aspects of the disclosure, reference will now be made to the appended drawings, which are not necessarily drawn to scale. The drawings are provided by way of example to assist in the understanding of aspects of the disclosure, and should not be construed as limiting the disclosure.

DETAILED DESCRIPTION

Figure 1:
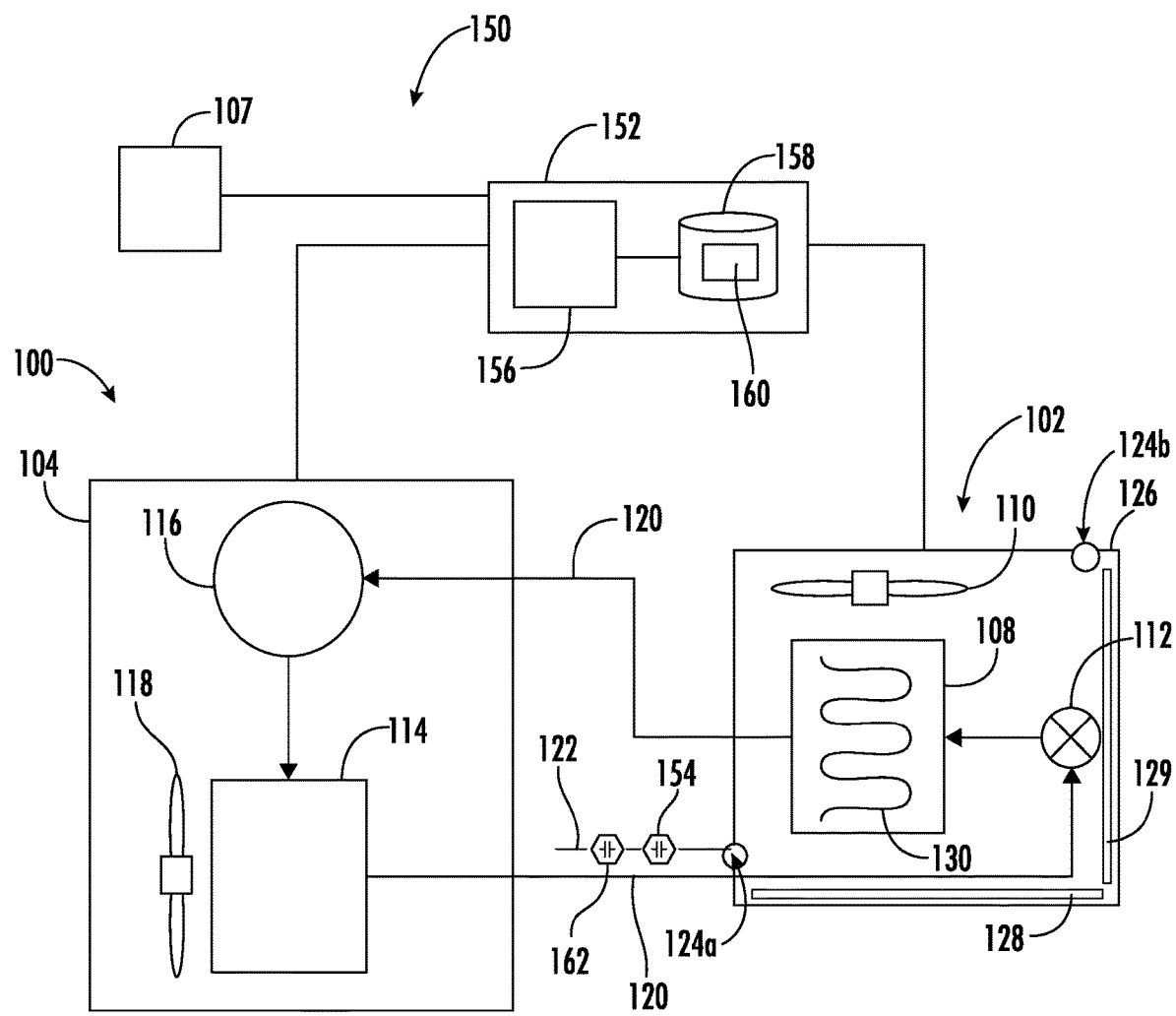
FIG. 1 illustrates a schematic of an HVAC system according to some example embodiments of the present disclosure.

Some embodiments of the present disclosure will now be described more fully hereinafter with reference to the accompanying figures, in which some, but not all embodiments of the disclosure are shown. Indeed, various embodiments of the disclosure may be embodied in many different forms and should not be construed as limited to the embodiments set forth herein; rather, these example embodiments are provided so that this disclosure will be thorough and complete, and will fully convey the scope of the disclosure to those skilled in the art.

For example, unless specified otherwise or clear from context, references to first, second or the like should not be construed to imply a particular order. A feature described as being above another feature (unless specified otherwise or clear from context) may instead be below, and vice versa; and similarly, features described as being to the left of another feature may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise, or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Like reference numerals refer to like elements throughout.

As used herein, the terms "bottom," "top," "upper," "lower," "upward," "downward," "rightward," "leftward," "interior," "exterior," and/or similar terms are used for ease of explanation and refer generally to the position of certain components or portions of the components of embodiments of the described disclosure. It is understood that such terms are not used in any absolute sense.

Example embodiments of the present disclosure relate generally to a method of commissioning an HVAC system. Example embodiments will be primarily described in conjunction with indoor units in HVAC applications, but it should be understood that example embodiments may be utilized in conjunction with a variety of other applications. For example, other HVAC devices include but are not limited to outdoor units, air handling units, packaged units, and the like may utilize the assembly described herein.

Referring now to FIG. 1, a schematic diagram of a HVAC system 100 according to some embodiments is shown. In this embodiment, HVAC system 100 is a vapor compression air-conditioning system that is configured to cool (and possibly dehumidify) an indoor space (e.g., home, office, retail store, etc.) by circulating a refrigerant so as to transfer heat from the indoor space to the outdoor environment. However, it should be appreciated that any suitable climate control system may be utilized in other embodiments, including heat pump systems that are capable of reversing the flow of refrigerant to transfer heat from the outdoor environment to the indoor space.

In this embodiment, the HVAC system 100 generally comprises a first unit 102 and a second unit 104. In some embodiments, the first unit 102 may be disposed within a building or structure (e.g., such as within an attic, utility room, etc.), while the second unit 104 may be disposed outdoors. As a result, the first unit 102 may be referred to as an "indoor unit" 102 and the second unit 104 may be referred to as an "outdoor unit" 104. However, it should be appreciated that the location and arrangement of the units 102, 104 may be altered in other embodiments such that the example locations of units 102, 104 described herein should not be interpreted as limiting all potential placements or arrangements of the units 102, 104 in various embodiments. For instance, in some embodiments, the indoor unit 102 and the outdoor unit 104 may be located within the same housing, often exterior to the interior space that HVAC system 100 is conditioning. Systems where the indoor unit 102 and the outdoor unit 104 are housed together are often referred to as packaged units.

Indoor unit 102 may comprise an indoor air handling unit comprising an indoor heat exchanger 108, an indoor fan 110, and an indoor metering device 112. In some embodiments, the indoor unit 102 is a cased coil, comprising an indoor heat exchanger 108 and an indoor metering device 112. The cased coil may be arranged to receive an airflow from an indoor fan provided within a furnace. The indoor heat exchanger 108 may generally be configured to promote heat exchange between refrigerant carried within internal tubing of the indoor heat exchanger 108 and an airflow that may contact the indoor heat exchanger 108 but that is segregated from the refrigerant. In some embodiments, the indoor heat exchanger 108 may function as an evaporator coil 130 that may contain a portion of the evaporated refrigerant. An evaporator coil 130 works to extract indoor heat from the air and add it to refrigerant. The evaporator coil 130 may be continuously exposed to the flow of warm air drawn by the indoor fan 110. The refrigerant circulating through the evaporator coil 130 is a cold vapor (e.g., around 40 degrees Fahrenheit). In this manner, heat energy airflow transfers through the evaporator coil 130 and is readily absorbed by the refrigerant flow. With its heat energy extracted by the evaporator coil 130, the cooled airflow is pushed out by the indoor fan 110. At the same time heat is being extracted, the warm air contacting the evaporator coil 130 triggers condensation, which lowers the humidity level in the airflow, "conditioning" the air.

Figure 2:
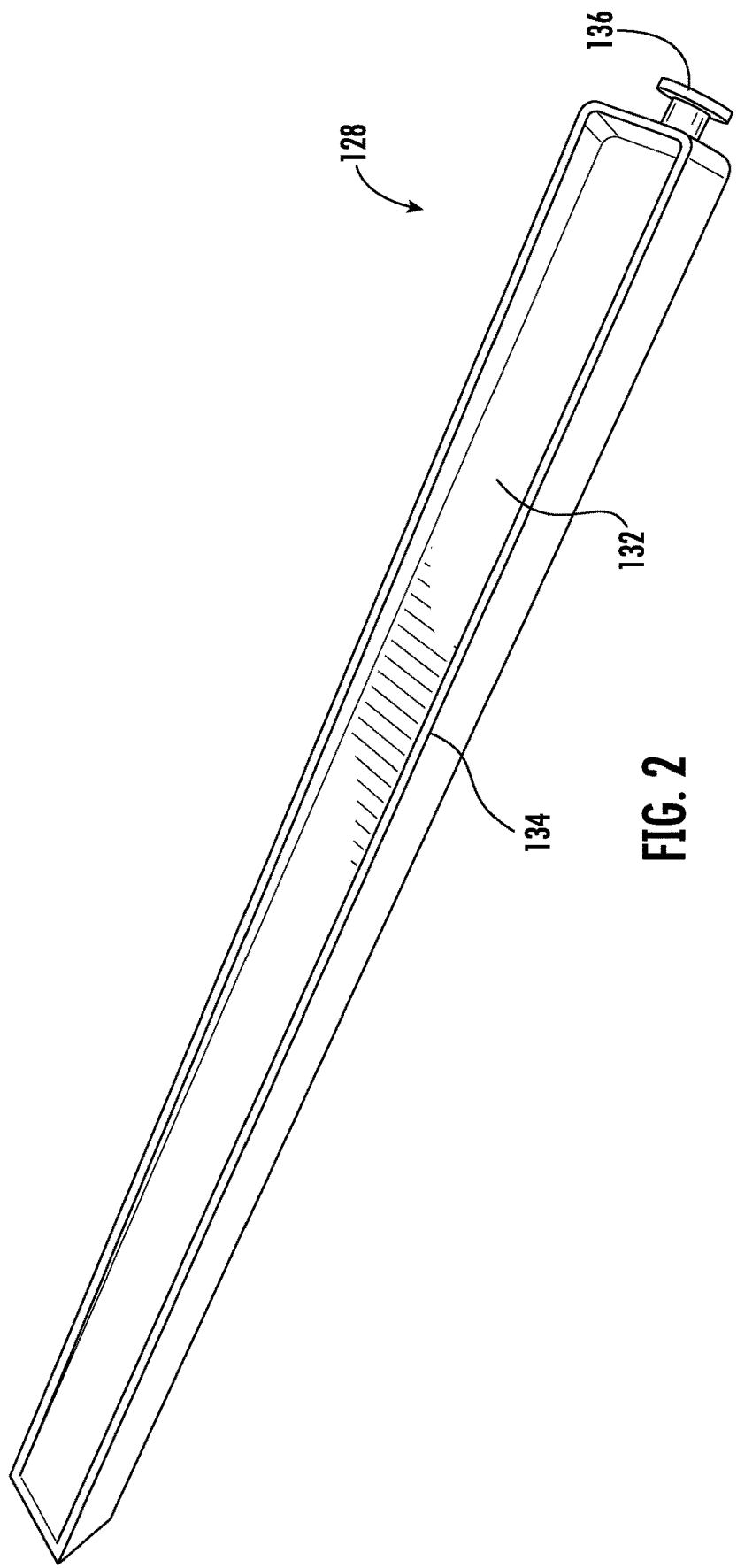
FIG. 2 illustrates an example of a condensate pan for an HVAC system according to some example embodiments of the present disclosure.

The condensation or "condensate" may collect in a condensate pan 128 which is arranged below the evaporator coil 130 within the indoor unit 102. The condensate may condense on the evaporator coil 130 and then drip down into the condensate pan 128 via gravity. As shown in FIG. 2, the condensate pan 128 may define a bottom surface 132 and a side wall 133 having a top edge 134 extending therefrom. An outlet 136 may be provided on either the bottom surface 132 or along the side wall 133 of the condensate pan 128. A geometry of the condensate pan 128 and geographic region (e.g., in view of the weather, humidity, etc.,) may largely determine a maximum expected height of condensate accumulation during normal operation, with a standard value for maximum expected height of condensate accumulation of the condensate within the condensate pan 128 being assigned for units of a given capacity and location as defined by a height of a dam in a secondary condensate port (not shown).

The indoor fan 110 may generally comprise a centrifugal blower comprising a blower housing, a blower impeller at least partially disposed within the blower housing, and a blower motor configured to selectively rotate the blower impeller. The indoor fan 110 may generally be configured to provide airflow through the indoor unit 102 and/or the indoor heat exchanger 108 to promote heat transfer between the airflow and the refrigerant flowing through the indoor heat exchanger 108. The indoor fan 110 may also be configured to deliver temperature-conditioned air from the indoor unit 102 to one or more areas and/or zones of an indoor space (not shown).

The indoor metering device 112 may generally comprise an electronically controlled motor-driven electronic expansion valve (EEV). In some embodiments, however, the indoor metering device 112 may comprise a thermostatic expansion valve, a capillary tube assembly, and/or any other suitable metering device. Indoor metering device 112 may be configured to meter the volume, pressure, and/or flow rate of refrigerant through the indoor metering device 112 during operations.

Referring again to FIG. 1, outdoor unit 104 generally comprises an outdoor heat exchanger 114, a compressor 116, and an outdoor fan 118. The outdoor heat exchanger 114 may generally be configured to promote heat transfer between the refrigerant carried within internal passages or tubing of the outdoor heat exchanger 114 and an airflow that contacts the outdoor heat exchanger 114 but that is segregated from the refrigerant. In some embodiments, outdoor heat exchanger 114 may comprise a plate-fin heat exchanger. However, in other embodiments, outdoor heat exchanger 114 may comprise a spine-fin heat exchanger, a microchannel heat exchanger, or any other suitable type of heat exchanger.

The compressor 116 may generally comprise a variable speed scroll-type compressor that may generally be configured to selectively pump the refrigerant at a plurality of mass flow rates through the indoor unit 102, the outdoor unit 104, and/or between the indoor unit 102 and the outdoor unit 104. For purposes of this disclosure, other types of compressors may be used, including rotary compressors and compressors configured to rotate at a fixed speed or speeds. The outdoor fan 118 may generally comprise an axial fan comprising a fan blade assembly and fan motor configured to selectively rotate the fan blade assembly. The outdoor fan 118 may generally be configured to provide airflow through the outdoor unit 104 and/or the outdoor heat exchanger 114 to promote heat transfer between the airflow and the refrigerant flowing through the indoor heat exchanger 108.

As shown in FIG. 1, during operation in a cooling mode, the HVAC system 100 is configured to circulate the refrigerant between the indoor unit 102 and outdoor unit 104 (e.g., via lines 120) such that heat may generally be absorbed by the refrigerant at the indoor heat exchanger 108 and rejected from the refrigerant at the outdoor heat exchanger 114. Starting at the compressor 116, the compressor 116 may be operated to compress the refrigerant and pump the relatively high temperature and high pressure compressed refrigerant to the outdoor heat exchanger 114, where the refrigerant may transfer heat to an airflow that is passed through and/or into contact with the outdoor heat exchanger 114 by the outdoor fan 118. After exiting the outdoor heat exchanger 114, the refrigerant flows to the indoor metering device 112, which may controllably expand the flow of refrigerant such that the refrigerant downstream of the indoor metering device 112 is at a lower pressure and temperature than the refrigerant upstream of the indoor metering device 112. From the indoor metering device 112, the refrigerant may enter the indoor heat exchanger 108. As the refrigerant is passed through the indoor heat exchanger 108, heat may be transferred to the refrigerant from an airflow that is passed through and/or into contact with the indoor heat exchanger 108 by the indoor fan 110. Refrigerant leaving the indoor heat exchanger 108 may flow back to the compressor 116, where the refrigeration cycle may begin again.

During operations of the HVAC system 100, the various operational parameters of the components of the indoor unit 102 and outdoor unit 104 (e.g., the speed, timing, etc. of the compressor 116, fans 118, 110, opening position of the indoor metering device 112, etc.) may be adjusted so as to achieve a desired operational performance. A desired operational performance of HVAC system 100 may be defined in a number of different ways and according to a number of different parameters, such as, for instance, a desired cooling capacity, efficiency, cycle time, leaving air temperature, cooling rate, etc. Accordingly, HVAC system 100 includes a control assembly 150 including one or more control unit(s) 152 that are to implement various control algorithms and methods for the various components of HVAC system 100 so as to achieve the desired operating performance as previously described above.

For example, the control unit 152 may comprise a single controller capable of controlling each of the indoor and outdoor units, as well as coordinate control of the whole HVAC system 100 or may comprise individual controllers, such as a first unit controller coupled to the indoor unit 102, a second unit controller coupled to the outdoor unit 104, and a system controller coupled to each of the unit controllers. Because the first unit controller and second unit controller are coupled to the indoor unit 102 and outdoor unit 104, respectively, the first unit controller may be referred to herein as an "indoor unit controller", and the second unit controller may be referred to herein as an "outdoor unit controller". The system controller may generally be configured to selectively communicate with indoor unit controller, outdoor unit controller, and/or other components of the HVAC system 100. In some embodiments, the system controller may be configured to control operation of the indoor unit 102 and/or the outdoor unit 104 via the indoor unit controller and/or outdoor unit controller, respectively. In some embodiments, the system controller may be configured to monitor and/or communicate, directly or indirectly, with a plurality of sensors associated with components of the indoor unit 102, the outdoor unit 104, etc. The sensors may measure or detect a variety of parameters, such as, for example, presence of condensate, pressure, temperature, and flow rate of the refrigerant as well as pressure and temperature of other components or fluids of or associated with HVAC system 100.

In one example embodiment, the HVAC system 100 may comprise a sensor 154 installed along a condensate line 122 of the indoor unit 102. The condensate line 122 may be attached to a condensate outlet 124*a* of a plurality of condensate outlets (e.g., two pairs of outlets) 124*a*, 124*b* defined in a housing 126 of the indoor unit 102. For example, the condensate line 122 connects to the condensate outlet 124*a* and may lead outdoors or otherwise channel condensate away from the unit in a manner that prevents the condensate from collecting in an undesired manner. Through the selected condensate outlet 124*a*, the condensate line 122 may be in fluid communication with the condensate pan 128 in each of the plurality of orientations of the indoor unit 102 (e.g., by being coupled with the outlet 136 of the condensate pan 128) within the indoor unit 102, and the condensate pan 128 acts to transport the condensate out of the indoor unit 102 to the outside. Usually the condensate line 122 is attached to the indoor unit 102 in such a way that gravity works to transport the condensate out of the indoor unit 102. However, a small pump (not shown) may be utilized to expedite the process of transporting the condensate through the condensate line 122 and into the outdoor environment. Alternatively, where the indoor unit 102 is another orientation, the condensate line 122 may be attached to the condensate outlet 124*b*, and another condensate pan 129 may be in fluid communication with the condensate line 122.

As shown in FIG. 1, the indoor unit 102 may be provided with the plurality of condensate outlets 124*a*, 124*b* such that the indoor unit 102 may be installed in a plurality of orientations. The condensate line 122 may be attached to a selected one of the condensate outlets 124*a*, 124*b* that is positioned to receive condensate based on a preferred orientation of the indoor unit 102. As used herein, "preferred orientation" refers to the indoor unit being a multi-poise unit that may be oriented relative to gravity in multiple orientations so that the indoor unit 102 may be installed as part of the HVAC system 100 in a manner that best suits the installation location and relative positioning of the components the HVAC system 100 and the ductwork typically connected thereto as is known to one of ordinary skill in the art. For example, the housing 126 of the indoor unit 102 may approximate a rectangular solid where in one orientation the housing 126 is arranged with the longest dimension arranged vertically and in a second orientation the longest dimension may be arranged horizontally. Thus, the indoor unit 102 may be configured to be capable of operation in both a horizontal and a vertical orientation, and the evaporator coil 130 may be reoriented depending on the desired orientation of the unit 102.

Discussed in more detail below, the sensor 154 as installed in the condensate line 122 may be configured to detect a presence of a refrigerant that is heavier than air and flows with gravity along with condensate collected by the indoor unit 102. The sensor 154 may comprise any sensor available in the art capable of detecting the presence of a refrigerant. Advantageously, the sensor 154 may detect the presence of a refrigerant, such as A2L-type refrigerants, which have lower Global Warming Potential, but higher flammability, than some alternative refrigerant types. To reduce fire risk in the event of a leak, the sensor 154 may interact with the control unit 152, such that the control unit 152 may receive a signal from the sensor 154 when the sensor 154 detects the presence of the refrigerant in the condensate pan 128 and perform an action in response thereto. Such action performed by the control unit 152 may include, for example, turning on the indoor fan 110, sounding an alarm, or providing an alert at an input/output device 107 (e.g., a graphical user interface, a touchscreen interface, or the like on a thermostat, smartphone application, etc.) for displaying information and for receiving user inputs, and/or shutting off flow of refrigerant, (e.g., cut power at the compressor 116 or activating a solenoid in an inlet line).

The i/o unit 107 may display information related to the operation of the HVAC system 100 (e.g., from control unit 152) and may receive user inputs related to operation of the HVAC system 100. During operations, i/o unit 107 may communicate received user inputs to the control unit 152, which may then execute control of HVAC system 100 accordingly. In some embodiments, the i/o unit 107 may further be operable to display information and receive user inputs tangentially related and/or unrelated to operation of the HVAC system 100. In some embodiments, however, the i/o unit 107 may not comprise a display and may derive all information from inputs from remote sensors (e.g., sensor 154) and remote configuration tools (e.g., remote computers, servers, smartphones, tablets, etc.). In some embodiments, control unit 152 may receive user inputs from remote configuration tools, and may further communicate information relating to HVAC system 100 to i/o unit 107. In these embodiments, control unit 152 may or may not also receive user inputs via i/o unit 107. In some embodiments, the control unit 152 and/or the i/o unit 107 may be embodied in a thermostat that may be disposed within the indoor space.

The control unit 152 may comprise any suitable electric control unit or assembly. Generally speaking, the control unit 152 may comprise any suitable device or assembly which is capable of receiving electrical (or other data) signals and transmitting electrical (or other data) signals to other devices. In particular, the control unit 152 may each generally include a processor 156 and a memory 158. The processor 156 (e.g., microprocessor, central processing unit, or collection of such processor devices, etc.) may execute machine-readable instructions 160 provided on the corresponding memory 158, respectively, (e.g., non-transitory machine-readable medium) to provide the processor 156 with all of the functionality described herein. The memory 158 of control unit 152 respectively may comprise volatile storage (e.g., random access memory), non-volatile storage (e.g., flash storage, read only memory, etc.), or combinations of both volatile and non-volatile storage. Data consumed or produced by the machine-readable instructions 160 can also be stored on the memory 158.

The control unit 152 may communicate with other components of (or in communication with) HVAC system 100 (e.g., i/o unit 107, other device (e.g., a condensate detection device 162 described in more detail below), a network, indoor unit 102, outdoor unit 104, etc.) via any suitable medium of communication. For instance, control unit 152 may communicate with other components (e.g., such as those mentioned above) via wireless communications (e.g., radio frequency communication, Wi-Fi, BLUETOOTH®, infrared communication, acoustic communication, etc.), wired communication (e.g., metallic wire, fiber optic cable, etc.), or a combination thereof.

In some example embodiments, the condensate detection device 162 may be installed along the condensate line 122 and/or proximate the condensate pan 128 to detect a presence of the condensate when it is more than the expected height of accumulation of the condensate. Normally, the condensate line 122 is mostly empty with a small amount of condensate flowing through to the outdoors. The condensate detection device 162 may be mounted at a certain height within the condensate line 122 so as to detect the presence of accumulated condensate within the condensate line 122 when it reaches more than the expected height of accumulation within the condensate pan 128 and begins accumulating within the condensate line 122. Where the condensate detection device 162 is installed proximate the condensate pan 128, the condensate detection device 162 may be arranged to detect an overflow of condensate from the pan 128 based on the expected height of accumulation of the condensate in the condensate pan 128. The condensate detection device 162 may comprise a sensor and/or a switch to help prevent overflow of condensate from the condensate pan 128 by sending a signal to the control unit 152 when the presence of condensate over an expected amount is detected, thereby signifying that the condensate reaches and is past the expected height of accumulation of the condensate in the condensate pan 128. The control unit 152 may perform an action in response to the signal from the condensate detection device 162. Such action may include, for example, turning off the indoor fan 110, sounding an alarm, or providing an alert at the input/output device 107, and/or shutting off flow of refrigerant so as to stop the accumulation of condensate in the condensate pan 128.

Referring still to FIG. 1, during operation of the HVAC system 100 (e.g., as refrigerant is circulated between the indoor unit 102 and outdoor unit 104 as previously described above), the control assembly 150 may select or adjust various operating parameters of the components of HVAC system 100 as generally described above. More particularly, in some embodiments, the control assembly 150 (including the control unit 152) may receive measured variables such as, for instance pressure, temperature, humidity, flow rate, etc. (or measurements or values that are indicative of these variables), and may implement various control algorithms, relationships, methods, conversions, etc. so as to adjust one or more operational parameters of the components of HVAC system 100. For example, during operations, control assembly 150 may determine a temperature of the refrigerant within the indoor heat exchanger 108, and based on this temperature, may adjust a position of the indoor metering valve 112, a speed of the indoor fan 110, outdoor fan 118, compressor 116, etc. so as to achieve or maintain a target value of the refrigerant temperature within the indoor heat exchanger 108.

Figure 3:
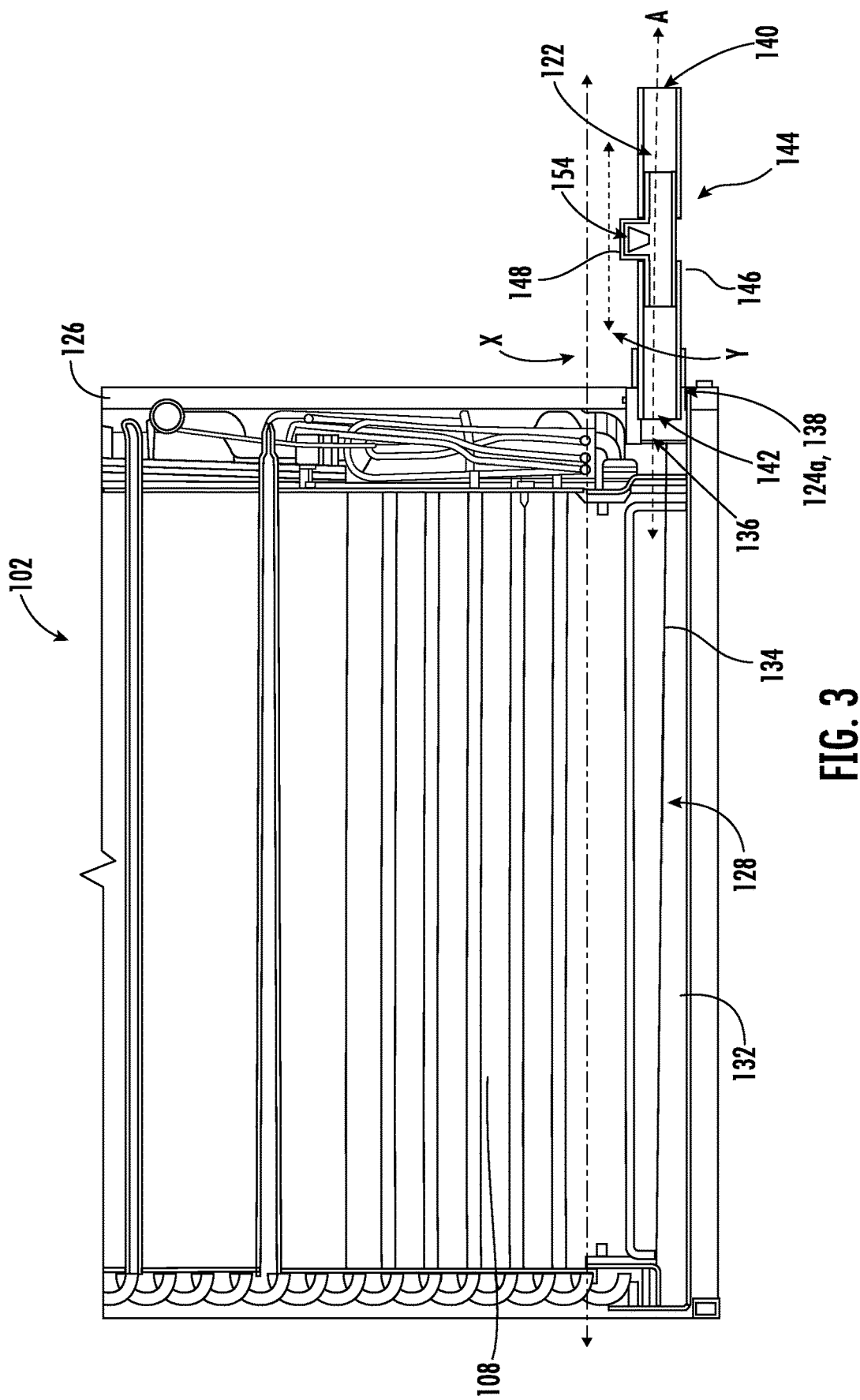
FIG. 3 illustrates a cross-section of a unit of an HVAC system according to some example embodiments of the present disclosure.

Turning now to FIG. 3, one example embodiment of a commissioned HVAC system 100 is illustrated. As shown in FIG. 3, the indoor unit 102 comprises the housing 126 with the at least one of the plurality of outlets 124a (outlet 124b not shown in FIG. 3) defined in the housing 126 such that the unit 102 may be installed in a plurality of orientations. The condensate line 122 is attached to a selected one of the condensate outlets 124a that is positioned to receive condensate based on the preferred orientation. As shown in FIG. 3, for example, this orientation is a vertical orientation for upflow operation. The sensor 154 is installed along the condensate line 122 and configured to detect a presence of a refrigerant that is heavier than air and would flow with gravity along with the condensate collected by the indoor unit 102. Notably, the sensor 154 may be calibrated for the type of refrigerant. Accordingly, if a leak occurs in the HVAC system 100, the heavier refrigerant will flow out of the condensate line 122.

The indoor unit illustrated in FIG. 3 further comprises the indoor heat exchanger 108 with the condensate pan 128 arranged underneath to collect the condensate on the bottom surface 132 of the condensate pan 128. Similar to the pan illustrated in FIG. 2, the condensate pan 128 defines a bottom surface 132 and a top edge 134 extending therefrom.

The plurality of condensate outlets 124a (124b not shown in FIG. 3) are, in some example embodiments, provided below the top edge 134 of the condensate pan 128 (condensate pan 129 not shown in FIG. 3) in each of the plurality of orientations of the indoor unit 102. For example, and as shown in FIG. 3, the condensate outlet 124a is provided below the top edge 134 of the condensate pan 128 in the vertical orientation. Preferably, the condensate outlet 124a is arranged as close to the bottom surface 132 of the condensate pan 128 as possible so that condensate does not accumulate in the condensate pan 128. The condensate outlet 124a is coupled to the outlet 136 of the condensate pan 128 such that the condensate flows out of the outlet 136 of the condensate pan 128, through the selected condensate outlet 124a, and into the condensate line 122. The condensate outlet 124a may be coupled to the outlet 136 through a threaded connection, a magnetic connection, a bayonet connection, a press-fit connection, a welded connection, or the like.

In some example embodiments, the condensate line 122 may be made of plastic (commonly polyvinyl choloride (PVC)), metal, or another similar material. The condensate line 122 may thus be formed by one or more components (e.g., PVC components) and extend substantially horizontal to the ground. Alternatively, the condensate line 122 may be angled downward. As shown in FIG. 3, for example, the condensate line 122 extends substantially horizontal to the ground. In some example embodiments, the condensate line 122 may be an open or trapped line. Where the condensate line is trapped, the condensate line 122 may comprise a vent (not shown).

The selected one of the condensate outlets 124a may define a longitudinal axis A extending therethrough. The sensor 154 may be installed along the condensate line 122 such that it is arranged above the longitudinal axis A, but below a limit above the top edge 134 of the condensate pan 128. In some example embodiments, the limit is about one inch above the top edge 134 of the condensate pan 128. Because the refrigerant is heavier than air, but lighter than the condensate, the sensor 154 may be placed up to the limit above the top edge 134 of the condensate pan 128 so as to detect the presence of refrigerant. Regarding the placement of the sensor 154 along the longitudinal axis A, the sensor 154 may be inserted at an opening 138 defined by the selected one of the condensate outlets 124a, 124b, at an open first end 140 of the condensate line 122 defined along a longitudinal length (i.e., along the direction of the longitudinal axis A) of the condensate line 122 and opposing an open second end 142 of the condensate line attached to the opening 138 of the selected condensate outlet 124a, 124b, or along the longitudinal length of the condensate line 122 between the open first and second ends 140, 142 thereof. As shown in FIG. 3, the sensor 154 is arranged along the longitudinal length of the condensate line 122 between the open first and second ends 140, 142 thereof.

In some example embodiments, the sensor 154 may be integrated into an existing condensate line 122 such that the sensor is retrofit with a previously-installed indoor unit 102. Otherwise, the sensor 154 may be installed onto a condensate line 122 prior to installation of the indoor unit 102. Different methods for installing the sensor 154 onto the condensate line (and/or the selected outlet) are contemplated herein. In one example embodiment, and as shown in FIG. 3, the condensate line 122 is separated somewhere between the open first and second ends 140, 142 thereof. A connecting bracket 144, such as a "T" shaped bracket is installed and the separated portions of the condensate line 122 are connected to the connecting bracket 144 about a first portion 146 of the connecting bracket 144. The sensor 154 is then mounted within a second portion 148 of the connecting bracket 144. With this example embodiment, the sensor 154 is mounted at a height Y below a height of expected refrigerant accumulation X inside the indoor unit 102, and below the limit above the top edge 134 of the condensate pan 128. Because the sensor 154 is mounted within the second portion 148 of the connecting bracket 144, which is above the longitudinal axis A of the condensate line 122, the sensor 154 is mounted above the expected height of accumulation of the condensate in the condensate line 122.

Figure 4:
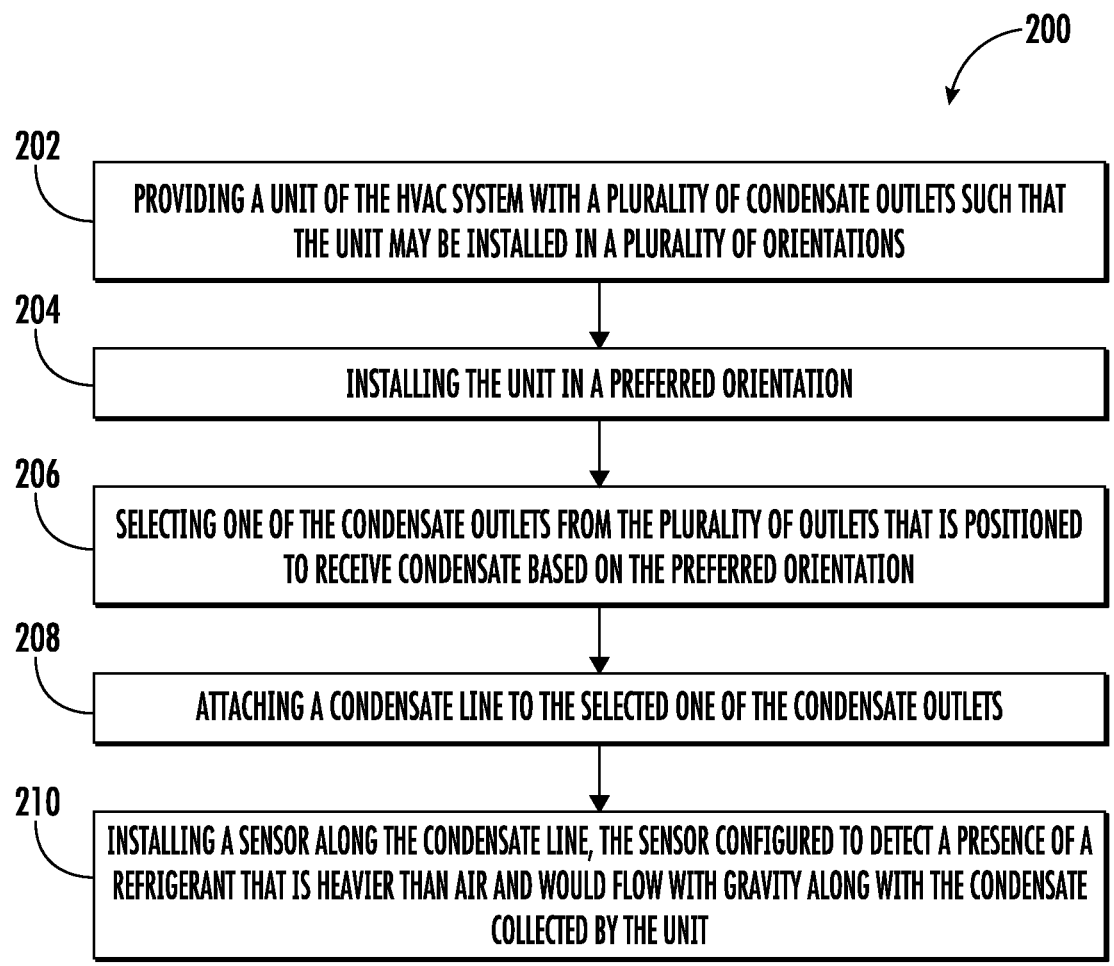
FIG. 4 illustrates a method flow diagram for a method of commissioning an HVAC system according to some example embodiments of the present disclosure.

In some other example embodiments, the sensor 154 may be integrated in an alternative manner. For example, a substantially waterproof sensor may be arranged along the length of the condensate line 122. In another example, the sensor 154 may be arranged external to the condensate line 122 and use ultrasonic sound waves to detect the presence of refrigerant. In a still further example, the sensor 154 may be directly attached to the outlet 136 of the condensate pan 128 or other condensate pan, such as pan 129. Turning now to FIG. 4, a method of commissioning an HVAC system 100 is provided, the method generally referred to as 200. In a first step, 202, a unit of the HVAC system is provided with a plurality of condensate outlets such that the unit may be installed in a plurality of orientations. In a second step, 204, the unit 102 is installed in a preferred orientation. In a third step, 206, one of the condensate outlets is selected from the plurality of outlets that is positioned to receive condensate based on the preferred orientation. In a fourth step, 208, a condensate line is attached to the selected one of the condensate outlets. In a fifth step, 210, a sensor is installed along the condensate line, the sensor configured to detect a presence of a refrigerant that is heavier than air and would flow with gravity along with the condensate collected by the unit.

Accordingly, the method of commissioning an HVAC system discussed herein provides features that mounting a sensor inside a unit of an HVAC system does not. In particular, installing a refrigerant leak sensor in connection with a condensate line outside of the housing of the indoor unit may allow for convenient installation due to increased access outside of the housing and the ability for the sensor to be agnostic toward the installed orientation of the unit.

Many modifications and other embodiments of the disclosure set forth herein will come to mind to one skilled in the art to which the disclosure pertains having the benefit of the teachings presented in the foregoing description and the associated figures. Therefore, it is to be understood that the disclosure is not to be limited to the specific embodiments disclosed and that modifications and other embodiments are intended to be included within the scope of the appended claims. Moreover, although the foregoing description and the associated figures describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method of commissioning an HVAC system, the method comprising:
    providing a unit of the HVAC system with a plurality of condensate outlets such that the unit may be installed in a plurality of orientations, the unit comprising a condensate pan defining a bottom surface and a side wall having a top edge extending therefrom, and wherein providing the unit with the plurality of condensate outlets comprises providing one of the plurality of condensate outlets below the top edge of the condensate pan in each of the plurality of orientations of the unit;
    installing the unit in a preferred orientation;
    selecting one of the condensate outlets from the plurality of outlets that is positioned to receive condensate based on the preferred orientation, wherein the selected one of the condensate outlets defines a longitudinal axis;
    attaching a condensate line to the selected one of the condensate outlets; and
    installing a sensor along the condensate line above the longitudinal axis, the sensor configured to detect a presence of a refrigerant that is heavier than air and would flow with gravity along with the condensate collected by the unit.

2. The method of claim 1, wherein arranging the sensor further includes arranging the sensor above the longitudinal axis and below a limit of one inch above the top edge of the condensate pan.

3. The method of claim 1, further comprising installing a condensate detection device along the condensate line.

4. The method of claim 1, wherein the unit is a multi-poise unit, and wherein installing the unit in the preferred orientation comprises installing the unit in a vertical orientation or a horizontal orientation.

5. The method of claim 1, further comprising interacting the sensor with a control unit of the HVAC system, the control unit comprising a processor and memory and being configured to receive a signal from the sensor when the sensor detects the presence of the refrigerant, and the HVAC system being configured to turn on the indoor fan in response thereto.

6. The method of claim 1, wherein installing the sensor comprises inserting the sensor:

at an open first end of the condensate line defined along a longitudinal length of the condensate line and opposing an open second end of the condensate line attached to the selected condensate outlet, or along the longitudinal length of the condensate line between the open first and second ends thereof.

7. A unit of an HVAC system comprising:

a housing;

a plurality of condensate outlets defined in the housing such that the unit may be installed in a plurality of orientations;

a condensate pan defining a bottom surface and a top edge extending therefrom, the condensate pan being arranged within the unit to collect the condensate on the bottom surface of the condensate pan in each of the plurality of orientations of the unit, wherein one of the plurality of condensate outlets is provided below the top edge of the condensate pan in each of the plurality of orientations of the unit;

a condensate line attached to a selected one of the condensate outlets that is positioned to receive condensate based on a preferred orientation, wherein the selected one of the condensate outlets defines a longitudinal axis; and a sensor installed along the condensate line above the longitudinal axis, the sensor configured to detect a presence of a refrigerant that is heavier than air and would flow with gravity along with the condensate collected by the unit.

8. The unit of claim 7, wherein the sensor is installed above the longitudinal axis and, but below a limit of one inch above the top edge of the condensate pan.

9. The unit of claim 7, further comprising a condensate detection device inserted along the condensate line.

10. The unit of claim 7, wherein the unit is a multi-poise unit, such that the unit is configured to be capable of operation in both a horizontal and a vertical orientation.

11. The unit of claim 7, further comprising a control unit comprising a processor and memory and being configured to receive a signal from the sensor when the sensor detects the presence of the refrigerant and being configured to turn on the indoor fan in response thereto.

12. The unit of claim 7, wherein the sensor is inserted:

at an open first end of the condensate line defined along a longitudinal length of the condensate line and opposing an open second end of the condensate line attached to the selected condensate outlet, or along the longitudinal length of the condensate line between the open first and second ends thereof.

13. The method of claim 1, wherein the longitudinal axis is positioned above the bottom surface.

14. The method of claim 1, wherein the installing the sensor along the condensate line includes installing the sensor outside of an HVAC housing.

15. The unit of claim 7, wherein the longitudinal axis is positioned above the bottom surface.

16. The unit of claim 7, wherein the installing the sensor along the condensate line includes installing the sensor outside of the housing.

* * * * *